(12) United States Patent
Chen et al.

(10) Patent No.: US 9,187,698 B2
(45) Date of Patent: Nov. 17, 2015

(54) FALLING FILM REACTOR FOR LIGHT TAR OXIDATION

(75) Inventors: Chong Chen, Broadview Hts., OH (US); Philip Dennis Coleman, Avon, OH (US)

(73) Assignees: Graftech International Holdings Inc., Independence, OH (US); JPMorgan Chase Bank N.A., as collateral agent, New York, NY (US)

(*) Notice: Subject to any disclaimer, the term of this patent is extended or adjusted under 35 U.S.C. 154(b) by 275 days.

(21) Appl. No.: 13/883,666

(22) PCT Filed: Nov. 11, 2011

(86) PCT No.: PCT/US2011/060347
§ 371 (c)(1),
(2), (4) Date: May 6, 2013

(87) PCT Pub. No.: WO2012/065047
PCT Pub. Date: May 18, 2012

(65) Prior Publication Data
US 2013/0228493 A1    Sep. 5, 2013

Related U.S. Application Data

(60) Provisional application No. 61/412,946, filed on Nov. 12, 2010.

(51) Int. Cl.
*C10G 3/00* (2006.01)
*C10C 3/02* (2006.01)
(Continued)

(52) U.S. Cl.
CPC .................. *C10C 3/023* (2013.01); *B01J 10/02* (2013.01); *B01J 19/0013* (2013.01); *B01J 19/247* (2013.01); *C10C 1/00* (2013.01); *C10C 1/16* (2013.01); *C10C 1/19* (2013.01);
(Continued)

(58) Field of Classification Search
CPC ............ C10C 3/023; C10C 1/00; C10C 1/19; C10C 3/002; C10C 1/16; B01J 19/0013; B01J 19/247; B01J 10/02; B01J 2219/185; B01J 2219/00159; B01J 2219/187
See application file for complete search history.

(56) References Cited

U.S. PATENT DOCUMENTS 2,752,290 A * 6/1956 Beattie ........................... 208/40
5,238,672 A   8/1993 Sumner et al.
(Continued)

FOREIGN PATENT DOCUMENTS

DE    850880       * 10/1960
GB    715316 A      9/1954
GB    850880 A     10/1960

OTHER PUBLICATIONS

International Search Report and Written Opinion issued by the European Patent Office on Jun. 25, 2012 for PCT/US11/060347.

*Primary Examiner* — Randy Boyer
*Assistant Examiner* — Juan Valencia
(74) *Attorney, Agent, or Firm* — Rankin Hill & Clark LLP

(57) ABSTRACT

A method of processing light fraction tar includes pre-heating the light fraction tar before directing it through a reactor. The reactor has a top and a bottom and a surface spanning between said top and said bottom. A film of the light fraction tar flows down the surface under the force of gravity and with heated gas blowing thereon. The portion of the film that reaches the bottom of the reactor has improved properties making it more widely useful for carbon products.

10 Claims, 3 Drawing Sheets

(51) Int. Cl.
*B01J 10/02* (2006.01)
*B01J 19/00* (2006.01)
*B01J 19/24* (2006.01)
*C10C 1/16* (2006.01)
*C10C 1/19* (2006.01)
*C10C 3/00* (2006.01)
*C10C 1/00* (2006.01)

(52) U.S. Cl.
CPC ....... *C10C 3/002* (2013.01); *B01J 2219/00159* (2013.01); *B01J 2219/185* (2013.01); *B01J 2219/187* (2013.01)

(56) References Cited

U.S. PATENT DOCUMENTS

| | | | |
|---|---|---|---|
| 5,316,654 | A | 5/1994 | Berkebile et al. |
| 5,429,739 | A | 7/1995 | Hanks et al. |
| 2007/0293713 | A1 | 12/2007 | Schmidt et al. |

* cited by examiner

| | Toluene Insoluables wt% | O/C Atomic Ratio | H/C Atomic Ratio | Carbon Yield % @500C (TGA) | Coking Value % (MCC) | Softening Point |
|---|---|---|---|---|---|---|
| Feedstock | 0 | 0.011 | 0.69 | 0.51 | 5.2 | <20C |
| 4.5 Min @ 350C | 14.9 | 0.02 | 0.61 | 19.5 | 32.8 | 82.7C |

Fig. 3

FALLING FILM REACTOR FOR LIGHT TAR OXIDATION

BACKGROUND ART

High softening point pitches are difficult to produce, but have many benefits, including relatively high coking values and reduced emissions during carbonation and graphitization processes. These pitches are useful for many applications, including, for example, binder pitch and the production of carbon fibers. In the past, many methods of producing high softening point pitches have been employed, such as, for example vacuum distillation, steam stripping, and addition of additive.

DISCLOSURE OF THE INVENTION

According to one aspect of the present invention, a method of processing light fraction tar is provided wherein the light fraction tar is preheated. The light fraction tar is then directed through a reactor having a top and a bottom and a heated surface spanning between the top and bottom upon which a film of the light fraction tar flows down under the force of gravity. As the light fraction tar flows a heated gas is blown over the film. The portion of the film that reaches the bottom of the reactor is then captured.

According to another aspect of the invention, a method of upgrading pitch is provided wherein a molten metal bath is charged with a feed-stock. High-softening point pitch is output from the molten metal bath. A by-product light fraction tar is directed from the molten metal bath through a reactor having a top and a bottom and a heated surface spanning between the top and bottom upon which a film of the light fraction tar flows down under the force of gravity. A heated gas is blown over the film and the portion of the film that reaches the bottom of the reactor is added back into the feed-stock of the molten metal bath.

BRIEF DESCRIPTION OF THE DRAWINGS

FIG. 3 is a table showing experimental results.

BEST MODE FOR CARRYING OUT THE INVENTION

Figure 1:
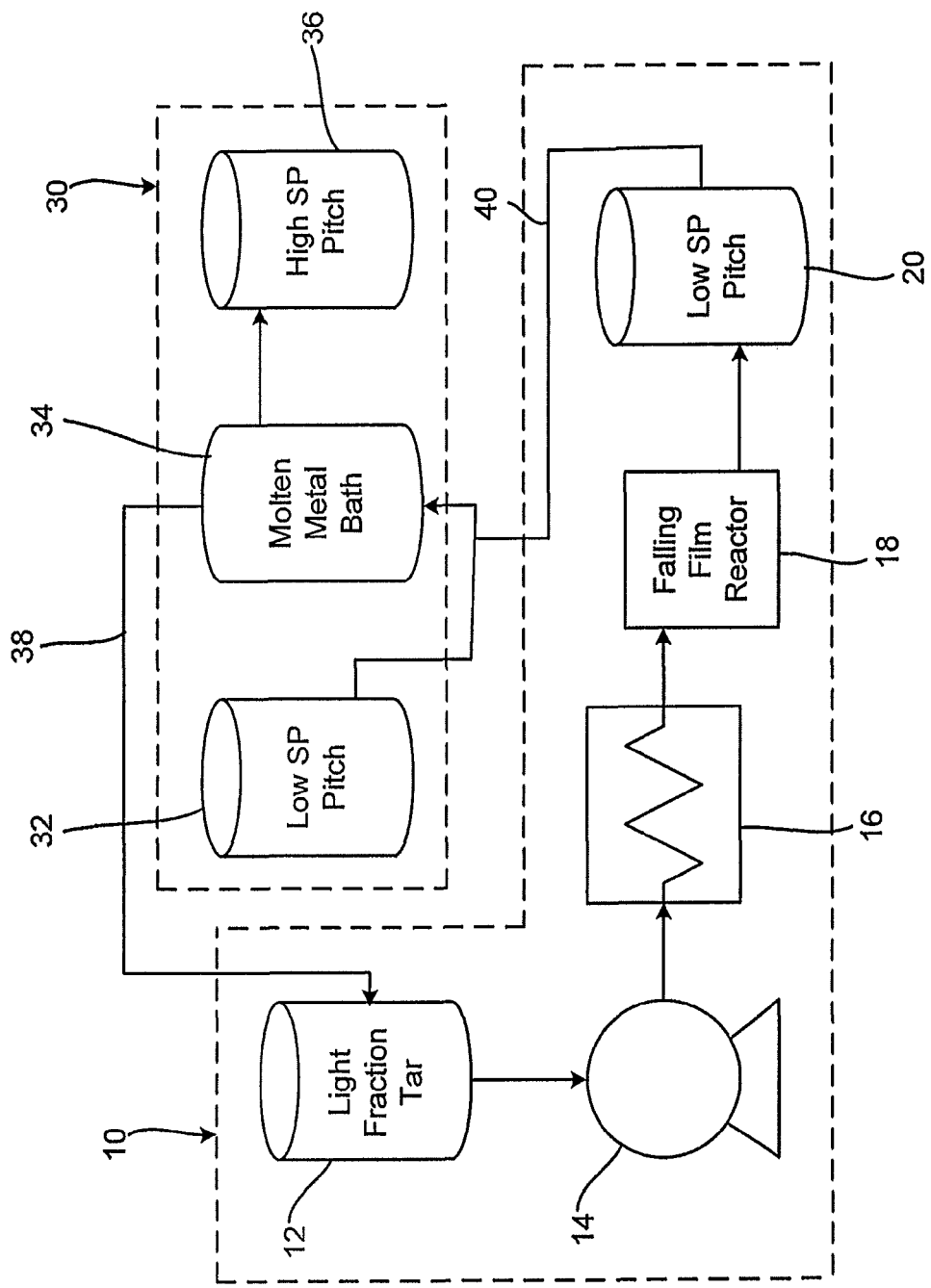
FIG. 1 is a schematic view of the falling film reactor system according to one aspect of the invention.

With reference now to FIG. 1, a falling film system 10 for generating and/or upgrading pitch is shown. A light fraction tar supply 12 may be provided from any distillation process. The light fraction tar (hereinafter "LFT") may optionally be supplied from waste by-product of a molten metal bath operation, as will be discussed in greater detail below. The LFT are the fractions from the distillation of the by-product from coking (coal tar) or petroleum refinery (decant oil) industry and are a mixture of numerous of aromatics. The boiling point of the LFT may range from, for example, about 200 C to about 400 C at atmosphere pressure according to a modified TGA method from ASTM E 2008. The coking value of LFT is relatively low. In one embodiment the coking value is less than 10%. In other embodiments the coking value is less than 5%. Because of this relatively low coking value, the substance has limited value in the carbon industry for use as, for example, a binder.

The LFT is provided to a pump 14 which pumps the LFT through an optional pre-heater 16. Heater 16 may be provided to initially raise the temperature of the LFT prior to charging the falling film reactor 18. Preheating of the LFT advantageously reduces the material's viscosity to enable advantaged process flow rates and film thickness. In one embodiment, heater 16 pre-heats the LFT to a temperature range of from about 50 C to about 300 C. In other embodiments, the LFT is preheated to a temperature range of from about 100 C to about 200 C. In still other embodiments, the heater 16 pre-heats the LFT to a temperature range of from about 140 C to about 160 C.

The flow rate of the LFT feed, the temperature of the preheated feed stock, and the temperature in the reaction zone are all variables that may be optimized to achieve desired reaction efficiencies and/rates rates. The flow rate may also vary depending on the gap opening and diameter of reactor 18. For example, larger reactors may accommodate larger flow rates while maintaining the same film thickness. The flow rate may range from about 5 to about 200 mL/min. In one embodiment, the flow rate of the LFT is from about 10 to about 50 mL/min for a 6" diameter reactor.

After the optional pre-heating stage, the LFT is charged into to a falling film reactor 18 where the LFT oxidizes, resulting in a low softening point pitch. The oxidation reaction that occurs in the falling film reactor induces oxygen functional groups into the chemical structure of the LFT and the oxidized material further increases its molecular size by polymerization. The reaction results in increased oxygen content, coking value and softening point as compared to the LFT feed stock. Depending on the degree of oxidation, the material may be used as, for example, binder pitch or as a precursor for isotropic coke.

Generally, in the falling film reactor 18 the LFT is provided at the top of a heated surface and allowed to flow down the heated surface, drawn by the force of gravity. The LFT forms a thin film along the heated surface to provide a large surface area relative to overall LFT volume. Heated air is directed over the thin falling film. In one embodiment the heated air is from about 100 C to about 200 C. In other embodiments the heated air is from about 140 C to about 160 C. In this manner, the LFT is oxidized as it travels down the heated surface.

By processing the light fraction tar through the falling film reactor, the LFT is converted to a pitch material and pumped or otherwise transported to storage container 20. The falling film reactor 18 may take any number of forms. In one embodiment, the reactor includes a relatively flat, downwardly angled heated surface. In this or other embodiments, the surface angle may be from about zero degrees (vertically oriented) to about 45 degrees. In other embodiments, the heated surface may be an enclosed tube wherein the film flows on the interior surface of the tube. The enclosed tube may have any number of cross-sectional shapes, for example, circular or rectangular. In one or more of the above embodiments, the heated surface may include a textured pattern thereon. The pattern could be, for example, horizontal or vertical corrugations, a zig-zag pattern or any other pattern that may tend to increase the surface area of the falling film and/or reduce the flow speed thereon. In this manner the patterns may increase residence time of the LFT in the reactor 18.

In certain embodiments, the heated surface may be heated to a temperature between about 200 and 400 degrees C. In other embodiments, the temperature may be between about 300 and 350 degrees C. In one embodiment, the heated surface may include more than one temperature zone. Generally, the heated zones may vary from relatively hotter proximate to the bottom of the heated surface and relatively less hot proximate to the top of the heated surface. In this manner, the temperature of the tar may be gradually raised as it flows down the heated surface.

Due to the large reaction surface and thin film formed in the falling film reactor, the oxidation reaction is more efficient than a typical air blowing oxidation operation. The reaction time may be shorten by over ten times as compared to the reaction time in a standard stirred vessel, e.g., from several hours to several minutes. The residence time is determined by the desired degree of reaction. For a fixed length falling film reactor, the residence time may be increased by cycling the product back through the reactor until the desired residence time (and corresponding oxidation levels) is achieved.

Figure 2:
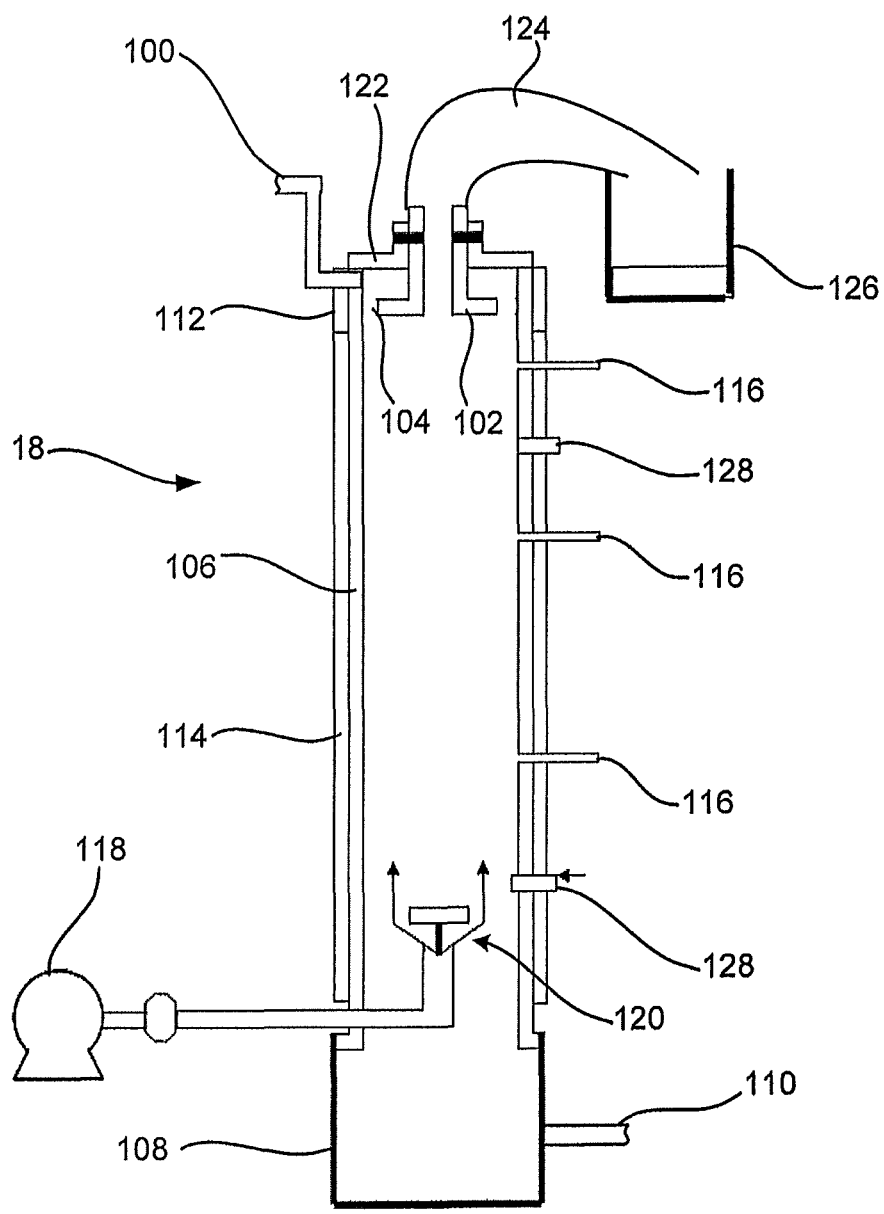
FIG. 2 is a front section view of one exemplary embodiment of a falling film reactor.

With reference now to FIG. 2, an embodiment of a falling film reactor 18 is shown. The LFT is provided through an inlet 100 to the interior of the reactor where it is deposited on a charge plate 102. Plate 102 is sized so that a gap 104 is formed between the outer radial edge of the plate and the inner surface of a cylindrical tube 106. The LFT flows down the interior surface of tube 106 under the force of gravity until it reaches a reservoir 108, where it is removed through outlet 110.

A top heater 112 is provided around a top portion of the tube 106. A bottom heater 114 is provided around the bottom portion of the tube 106. In this manner, the tube 106 may be heated to different temperatures. For example, the bottom portion of the tube may be heated to a higher temperature than the top portion of the tube. Temperatures may be monitored using one or more thermo-couples 116 positioned at various locations spaced longitudinally along tube 106.

An air pump 118 provides heated air to a nozzle 120 positioned at the interior of the tube proximate to the bottom and directs air radially outwardly and upwardly. In this manner, the heated air contacts the film of LFT as gravity pulls it down the walls of the tube 106. The top of the tube is sealed by a lid 122 to which is attached an air outlet tube 124. Outlet tube 124 is directed to a condensate reservoir 124. Additional gas inlets 128 may be positioned at spaced positions along the tube 106 to provide, for example, Nitrogen gas as needed for safety purposes.

The falling film system 10 may be used in isolation or may be used in combination with further pitch upgrading systems to improve efficiency and yields. Again with reference to FIG. 1, the falling film system 10 may be used in conjunction with a molten metal bath pitch upgrade system 30. As can be seen the molten metal bath includes as an input material a supply of low softening point pitch 32 (i.e. pitch having a softening point below about 100 C) or other feedstock such as coal tar distillate, decant oil or the recycled light fraction from the molten metal bath. The input material is charged into a molten metal bath 34 where the input material is in direct contact with the heat exchange material (the molten metal). The molten metal material is preferably immiscible with, and denser than, the input material. The input material is fed into the bottom of the molten metal bath 34. The input material is heated by the direct contact with molten metal to cause thermal polymerization of the input material. Molten metal baths are well known in the art, and are disclosed in, for example, U.S. Pat. No. 7,318,890 to Malone titled "Pitch Fractionation and High Softening Point Pitch," the contents of which are hereby incorporated by reference in their entirety.

High softening point pitches generally have a softening point above 100 C. Typically, a high softening point pitch has a softening point from between about 100 C and about 300 C. In other embodiments, the high softening point pitch has a softening point above 150 C. In other embodiment, high softening point pitch has a softening point above 200 C. For example, in one embodiment the pitch has a softening point of 150 C. In another example, the pitch has a softening point of 170 C. High softening point pitch is output from the molten metal bath process and transferred to storage container 36. Yields from the molten metal bath may range from about 50 to about 80 percent. Typically, a relatively lower yield corresponds to a higher softening point pitch output. Light fraction tar is a by-product of the molten metal bath. The light fraction tar may be fed by line 38 to the falling film system 10 as the input material. After processing through the falling film reactor 18, the low softening point pitch material may be mixed into the feedstock or directly fed back into the input material through line 40 to be charged back into the molten metal bath 34.

By using the falling film reactor system to recover and process by-product waste light fraction tar from the molten metal bath, the yields may improved significantly. The high softening point pitch produced from the above described process may be used for any number of applications. The high softening point pitch may be further heat treated to form meso-phase pitch. The meso-phase or isotropic high softening point pitch may be used to produce, for example, carbon fibers.

EXAMPLE

A feedstock light fraction tar was processed using a cylindrical falling film reactor having a length of approximately 6 ft. The reactor surface was heated to 350 C and the blower air was heated to 150 C. The feedstock, when charged into the reactor, had a residence time of approximately 30 seconds until reaching the bottom of the reactor. The feedstock was recharged into the reactor a total of 9 times for a total residence time of approximately 4.5 minutes.

The process achieved a 15 percent yield and improved the LFT properties significantly. With reference to FIG. 3, it can be seen that the softening point and carbon yields of the resulting product were significantly increased. Likewise, the oxygen to carbon ratio (indicating oxidation reaction) approximately doubled.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method of upgrading pitch comprising:
   charging a molten metal bath with a feed-stock;
   capturing high-softening point pitch output from said molten metal bath;
   directing by-product light fraction tar from said molten metal bath through a reactor having a top and a bottom and a surface spanning between said top and said bottom upon which a film of said light fraction tar flows down under the force of gravity;
   heating said surface;
   blowing a heated gas over said film; and
   adding back into said feed-stock the portion of said film that reaches the bottom of said reactor.

2. The method of claim 1 wherein said feed-stock comprise low softening point pitch or decant oil.

3. The method of claim 1 wherein said pre-heating step comprises preheating said light fraction tar to a temperature of from about 100 to about 300 degrees C.

4. The method of claim 1 further comprising heating said surface between about 200 and about 400 degrees C.

5. The method of claim 1 further comprising heating said surface between about 300 and about 350 degrees C.

6. The method of claim 4 wherein said surface includes at least two distinct temperature zones.

7. The method of claim 1 wherein said reactor includes a cylindrical tube and said surface comprise the interior surface of said cylindrical tube.

8. The method of claim 1 wherein said light tar fraction is directed through said reactor at a flow rate of from 5 to 200 mL/min.

9. The method of claim 1 wherein said gas comprises air.

10. The method of claim 1 wherein said gas is heated to a. temperature of from between 100 and about 200 degrees C.

\* \* \* \* \*